BISTABLE TRIGGER CIRCUIT WITH FEEDBACK AMPLIFIER

Filed Dec. 2, 1957 2 Sheets-Sheet 1

Inventor:
Bernhard Rall
By [signature]
Patent Agent

May 5, 1964 B. RALL 3,132,303

BISTABLE TRIGGER CIRCUIT WITH FEEDBACK AMPLIFIER

Filed Dec. 2, 1957 2 Sheets-Sheet 2

Inventor:
BERNHARD RALL
BY [signature]
PATENT AGENT

United States Patent Office 3,132,303

Patented May 5, 1964

3,132,303

BISTABLE TRIGGER CIRCUIT WITH FEEDBACK AMPLIFIER

Bernhard Rall, Ulm (Danube), Germany, assignor to Telefunken G.m.b.H., Berlin, Germany Filed Dec. 2, 1957, Ser. No. 700,148
Claims priority, application Germany Dec. 11, 1956
4 Claims. (Cl. 328—248)

The present invention relates to a bistable trigger circuit with a feedback amplifier particularly suitable for high trigger frequencies, as for example required in electronic computer machines.

An amplifier system with feedback may have two stable operating points if the following conditions are fulfilled.

(1) The voltage and current amplification without feedback has to be greater than unity within the two limits;

(2) The input and output voltages have to have the same phase.

These conditions are met by the known Eccles-Jordan circuits, in which a feedback circuit with two direct current amplifier stages is used.

It is an object of the present invention to provide a novel and improved circuit, wherein only a single amplifier stage is employed to fulfill the second of the aforementioned conditions with the aid of an alternating voltage fed from an outside source and rectified to obtain the proper bias voltage on the amplifier stage.

A bistable trigger circuit with one amplifier employing feedback and an outside A.C. voltage source has been known per se (see Electronics, March 1956, pages 230 and 232). In this known circuit, an amplifier is provided wherein an A.C. voltage source is connected in the cathode circuit and positive and negative control pulses are alternately fed to the grid of the amplifier. A rectifier is connected to the anode circuit, said rectifier rectifying the amplified A.C. voltage. The rectified voltage is fed back to the grid of the tube as an input voltage. The diode is polarized in such a direction, that the tube has two stable operating points. At one of these points, the tube will be blocked by a negative bias voltage, so that the A.C. voltage is not amplified and, thereby, the blocked condition is maintained. At the other of these points, the tube is rendered conductive, for example, by a positive pulse applied to the grid, so that the A.C. voltage is amplified and a grid bias voltage is produced in the rectifier maintaining the tube conductive until a negative pulse is received causing blocking. Such a circuit has the disadvantage that only relatively low pulse frequencies can be used for control purposes, because the amplifier has to operate not only as a D.C. amplifier, but also as an A.C. amplifier with capacitive load and, therefore, the frequency response to A.C. voltages is limited. The length of the switching pulses has to be large with respect to the repetition rate of the A.C. voltage, so that only relatively low pulse frequencies can be employed in this circuit.

It is another object of the invention to insert between the A.C. voltage source and a rectifier connected to the control electrode of the amplifier a gate adapted to be rendered conductive or non-conductive by the output signal of the amplifier in such a manner, that the A.C. voltage having passed the gate produces in the rectifiers a bias voltage applicable to the amplifier for maintaining the latter at one stable point whereat its output signal maintains the gate in conductive condition. However, in the absence of an A.C. output voltage to the rectifier, the amplifier receives a biasing voltage maintaining the latter at the second stable point whereat its output voltage maintains the gate in non-conductive condition. In contrast to the abovementioned prior art circuit, there is excluded from the amplifier itself of the present invention the function of the gate, so that this amplifier serves only to amplify the D.C. voltage rather than an A.C. voltage.

As a result of this, a much higher pulse frequency and much shorter control pulses can be employed in the new circuit, so that these pulses can be utilized, for example, in electronic calculating machines operating at high speed.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figures 1, 2:
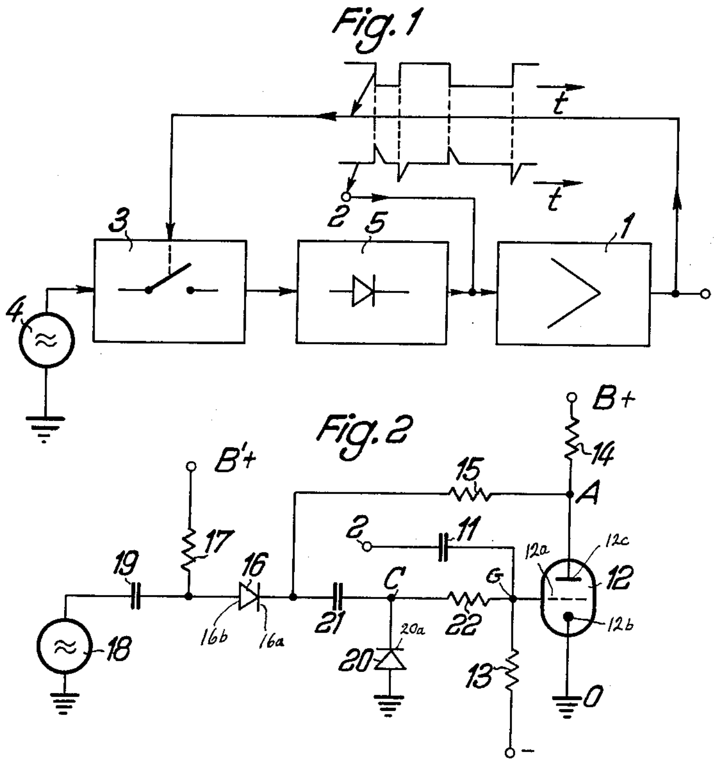
FIGURE 1 is a basic block diagram of a trigger circuit according to the invention.
FIGURES 2 to 5 illustrate more detail circuits of several embodiments according to the invention.

In FIGURE 1, an amplifier stage 1 receives alternately positive and negative control pulses from an input terminal 2. Depending upon the type of amplifier stage, the latter will be rendered conductive either by a positive or by a negative control pulse. The output voltage of the amplifier controls a gate 3, represented in FIGURE 1 as a switch closed when the amplifier 1 is conductive. As a result of this, an A.C. voltage from a source 4 passes to a rectifier stage 5 in which a bias voltage for the amplifier stage 1 is generated to maintain this stage conductive. If, however, a pulse blocking the amplifier stage 1 is received from the terminal 2, the gate 3 is opened, i.e., the symbolically indicated switch is opened, so that the A.C. voltage from the source 4 can no longer pass to the rectifier 5. Thus, the bias voltage to the amplifier is changed to a value maintaining the amplifier in non-conductive condition until a new and opposed pulse is received at the terminal 2.

In the circuit according to the invention, either tubes or transistors can be used in the amplifier stages. Diodes, preferably semi-conductor diodes or tube diodes can be used as gates.

FIGURE 2 shows an embodiment of a circuit having a triode tube as an amplifier stage. The input terminal 2 is connected to the grid 12*a* of the tube 12 via a condenser 11, the cathode 12*b* of this tube 12 being grounded. The grid receives a negative bias voltage via resistor 13, whereby this tube is normally cut off. The anode 12*c* of the tube 12 is connected to a positive voltage source B+ via a resistance 14 and via a resistance 15 to the cathode 16*a* of a diode 16 serving as gate. The anode 16*b* of the diode 16 is connected with a positive voltage source B′+ via a resistance 17, the voltage of the latter source being lower than that of the voltage source B+. Consequently, when the tube 12 is cut off, the diode 16 is also blocked, so that no A.C. voltage can pass from an A.C. voltage source 18 to a diode 20 via condensers 19 and 21. If now a positive pulse is received at the input terminal 2 and fed to the grid 12*a* of the tube 12 via the condenser 11, the tube 12 is rendered conductive, permitting anode current to flow through the resistance 14. As a result of this, the anode voltage at A is lowered below the value of the voltage source B′+. Therefore, the diode 16 will open, permitting the A.C. voltage of the source 18 to pass to the diode 20. This A.C. voltage is rectified in this diode through the cathode-grid path of the tube 12, and produces a positive D.C. voltage at the point C connected to the cathode 20*a* of the diode, which D.C. voltage is passed to the grid 12*a* of the tube 12 via a resistance 22. A positive bias voltage is now present at the voltage divider point G between the resistances 13 and 22, said biasing voltage maintaining the tube 12 conductive until the next negative pulse is received at the input terminal 2.

Figure 3:
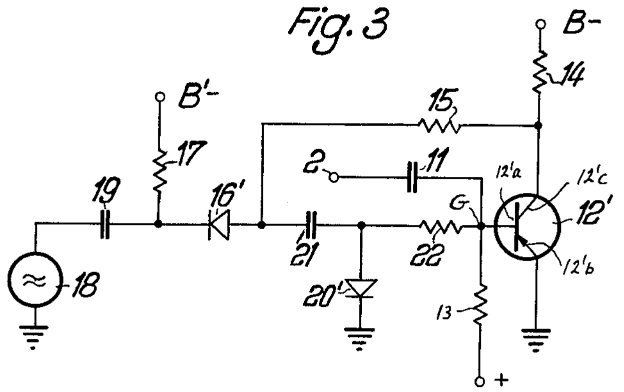

FIGURE 3 shows a circuit similar to that of FIGURE 2, wherein the tube has been replaced by a transistor. The emitter 12′*b* of the transistor 12′ replaces the cathode 12*b* of the tube 12 in FIGURE 2, the base 12′*a* of the transistor replaces the grid 12*a* of the tube, and the collector 12′*c* of the transistor the anode 12*c* of the tube. In addition to this, all voltages are reversed with respect to the voltages in the circuit of FIGURE 2. The collector voltage is negative and, therefore, is designated by B−. Diodes 16′ and 20′ in FIGURE 3 are reversed in polarity with respect to the diodes 16 and 20 in FIGURE 2, and the bias voltage supplied via the resistance 17 is likewise negative and, therefore, indicated by B′−. The operation and function of the circuit of FIGURE 3 corresponds to that of FIGURE 2, so that it need not be described. Junction transistors may be used as the transistor elements.

In FIGURES 2 and 3, a transformer coupling may be substituted for the capacitive coupling via the condenser 19, whereby the secondary of the transformer may be inserted in the feed line to the bias voltage source B′ of the gate diode 16. In case of use of a larger number of trigger stages of the type described in an apparatus, a common A.C. voltage source 18 inclusive the transformer 18*a* may be used for all of the gate diodes 16.

Figure 4:
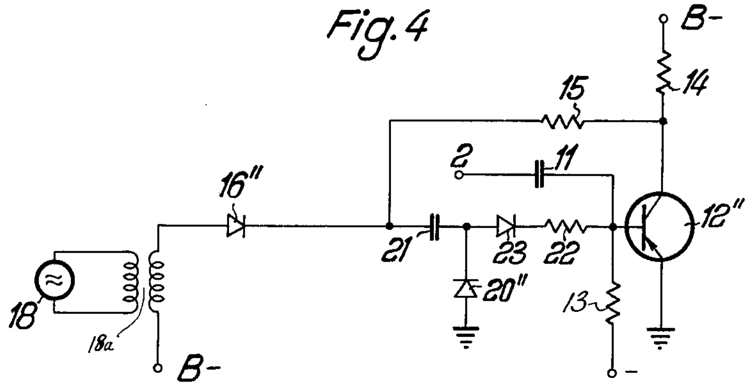

The amplifier stages in the foregoing embodiments are biased from non-conductive to conductive condition by means of rectified A.C. voltages. However, it is also possible to use the reverse approach, wherein the amplifier is normally biased conductive and is rendered non-conductive when the gate is opened by a rectified A.C. voltage. The gate is then in conductive condition when the amplifier is non-conductive. An example of such a circuit, using a junction transistor, is illustrated in FIGURE 4. The circuit components are substantially the same as those in FIGURE 3, from which the circuit of FIGURE 4 differs only in that the diodes 16″ and 20″ have the opposite polarity as the corresponding diodes 16′ and 20′ in FIGURE 3, and in that a further diode 23 is inserted in series with the resistance 22, said latter diode serving to rectify the opposite half wave of the A.C. voltage rectified in the diode 20″. This function is accomplished in the circuit of FIGURE 3 by the base-emitter path of the transistor 12′, and in the system of FIGURE 2, by the grid-cathode path of the tube 2. The operation of the circuit according to FIGURE 4 corresponds otherwise to those in the foregoing examples, so that it need not be explained in detail.

Figure 5:
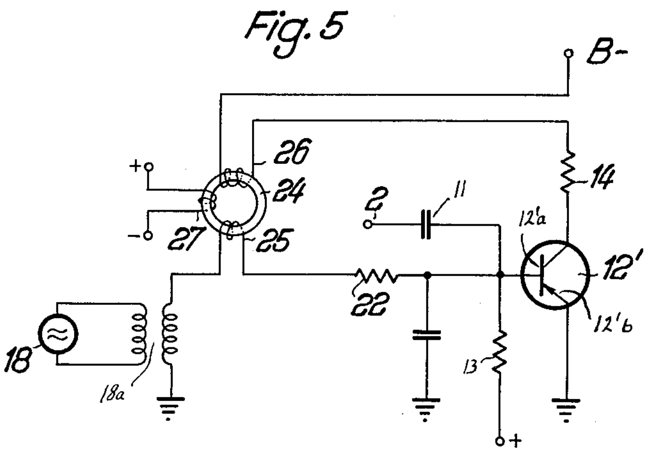

A magnetic amplifier with a bistable magnetic core may be used as a gate instead of the diodes 16, 16′ or 16″, used in the foregoing embodiments. FIGURE 5 shows an example of such circuit, suitably employing a magnetic amplifier with an annular core of a material having a hysteresis characteristic as rectangular as possible. The annular core is provided with at least two windings. In the embodiment of FIGURE 5, one winding 25 of the magnetic amplifier 24 is inserted between the coupling transformer 18*a*, the A.C. voltage source 18 and the base 12′*a* of the transistor 12′, while another winding 26 of this amplifier is connected in the collector circuit. The transistor is brought from non-conductive to conductive condition by a pulse received at the terminal 2, so that a current starts to flow through the winding 26. This current causes saturation of the magnetic amplifier to an extent at which the impedance of the winding 25 is substantially lowered, so that now an A.C. current can flow from the A.C. source 18, which current is rectified in the base-emitter path of the transistor and produces a bias voltage maintaining the transistor conductive. The transistor is brought to non-conductive condition by the introduction of an input pulse of opposite polarity at the terminal 2, and this non-conductive condition will be maintained because no current then flows in the winding 26 and, therefore, the winding 25 assumes a high impedance, preventing alternating current to pass from the source 18. The magnetic amplifier may, as shown in FIGURE 5, be provided with a third winding 27 through which a D.C. current of adjustable magnitude may be passed to adjust the operating point.

I claim:

1. A bistable circuit to be controlled by alternate polarity pulses, comprising a direct current power source; a direct current amplifier having an output circuit connected with said power source and having a control electrode connected to receive said pulses for alternately rendering the output circuit conductive and nonconductive; fixed bias means connected with said control electrode and tending to establish one condition of output circuit conductivity; a second bias means connected with said control electrode and including a source of alternating current and rectifier means connected to said alternating current source with such polarity as to deliver a unidirectional second bias opposite in polarity to and greater than said fixed bias; and a gate connected with said second bias means and having gate control means connected with said output circuit for completing the circuit through the gate from the second bias means to apply unidirectional second bias to the control electrode when a pulse of polarity the same as that of the unidirectional second bias establishes the corresponding condition of conductivity in the output circuit, whereby the condition of conductivity of said amplifier, as dictated by a given pulse, is preserved until the occurrence of a subsequent pulse.

2. In a circuit as set forth in claim 1, said fixed bias being connected to said electrode and normally maintaining the amplifier conductive; and said gate being blocked by said amplifier until a pulse of polarity opposite to said fixed bias is applied to said control electrode, whereby the amplifier is rendered non-conductive and the gate opened to apply alternating current to said rectifier means.

3. In a circuit as set forth in claim 1, said gate comprising a diode, a second fixed bias potential applied to the diode to bias it to one condition of conductivity, and coupling means from the output of said amplifier to the diode to apply an opposing bias during one condition of conductivity of the amplifier.

4. In a circuit as set forth in claim 1, said gate comprising a magnetic amplifier having a core and a winding and having core saturation control means, said winding being connected between said alternating current source and said rectifier means, and the output of said amplifier being connected to said saturation control means.

References Cited in the file of this patent

UNITED STATES PATENTS

| | | |
|---|---|---|
| 2,756,329 | Lubkin | July 24, 1956 |
| 2,758,208 | Grayson | Aug. 7, 1956 |
| 2,764,688 | Grayson et al. | Sept. 25, 1956 |
| 2,802,118 | Simkins | Aug. 6, 1957 |
| 2,861,199 | Henle | Nov. 18, 1958 |
| 2,876,367 | Sumner | Mar. 3, 1959 |
| 2,946,896 | Alizon et al. | July 26, 1960 |

OTHER REFERENCES

"A Transistor-Magnetic Core Circuit . . ." by Guterman et al., 1955, I.R.E. Convention Record, part 4, pages 84 to 94; March 21 to 24, 1955.

UNITED STATES PATENT OFFICE
CERTIFICATE OF CORRECTION

Patent No. 3,132,303 May 5, 1964

Bernhard Rall

It is hereby certified that error appears in the above numbered patent requiring correction and that the said Letters Patent should read as corrected below.

In the grant, lines 2 and 11, and in the heading to the printed specification, line 5, name of assignee, for "Telefunken G.m.b.H.", each occurrence, read -- Telefunken Aktiengesellschaft --.

Signed and sealed this 8th day of September 1964.

(SEAL)
Attest:

ERNEST W. SWIDER
Attesting Officer

EDWARD J. BRENNER
Commissioner of Patents